United States Patent Office 3,200,115
Patented Aug. 10, 1965

3,200,115
17 - TETRAHYDROPYRANYL ETHERS OF 3 - DES-
OXY- AND 19-NOR-3-DESOXY-$\Delta^2$-ANDROSTENES
Alexander D. Cross, Mexico City, Mexico, assignor to
Syntex Corporation, Panama, Panama, a corporation
of Panama
No Drawing. Filed Nov. 18, 1963, Ser. No. 324,254
Claims priority, application Mexico, Jan. 3, 1963, 70,368
5 Claims. (Cl. 260—239.55)

This invention relates to novel cyclopentanopolyhydrophenanthrene derivatives and to processes for the preparation thereof.

More particularly, this invention relates to novel 17-tetrahydropyranyl ethers of 3-desoxy-$\Delta^2$-androstenes and 19-nor-3-desoxy-$\Delta^2$-androstenes represented by the general formula:

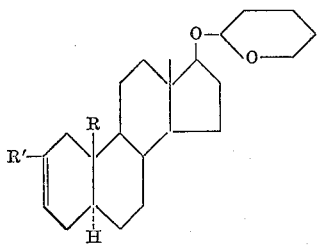

wherein R represents hydrogen or methyl and R' represents methyl or a cyano group.

A considerable amount of research in the steroid field has been done in the area of anabolic agents, inasmuch as such compounds are useful in many areas of human and veterinary medicine. Thus, for example, an important application of anabolic agents in human therapy, is in cases where the patient suffers from any of a number of debilitating diseases or conditions which produce a negative nitrogen balance, such as deficient nutrition or growth, chronic cachetic disease, and osteoporosis, wherein it is necessary to increase the metabolism of proteins and obtain a positive nitrogen balance and greater deposition of calcium bone tissues. Similarly, anabolic agents are extremely useful in the post-operative treatment of patients recovering from major surgical operations.

It is known that androstane derivatives, such as testosterone, 19-nortestosterone and various substituted derivatives thereof exhibit good anabolic activity when administered parenterally, and that this is particularly the case with 17$\alpha$-alkyl substituted derivatives such as 17$\alpha$-methyltestosterone, 6$\alpha$,17$\alpha$-dimethyltestosterone, 2-hydroxymethylene-17$\alpha$ - methyldihydroallotestosterone, 2$\alpha$, 17$\alpha$-dimethyldihydroallotestosterone, and the like. However, it is also known that androstane derivatives of the type in question which do not have a 17$\alpha$-alkyl substituent exhibit either very low anabolic activity or no anabolic activity at all when administered orally.

The present invention is based on the surprising and unexpected discovery that the novel 17-tetrahydropyranyl ethers represented by the above general formula, unlike the corresponding 17-untherified compounds, exhibit good anabolic activity when administered orally. In addition, the androgenic activity of these 17$\beta$-tetrahydropyranyloxy derivatives is low. Thus, when their anabolic/androgenic activity is measured by administering them orally to castrated young male rats and then determining the response to this treatment by increases in the weights of the ventral prostate, seminal vesicles and levator ani muscles, it is found that these 17-tetrahydropyranyl ethers possess very low androgenic activity, while their anabolic activity is markedly greater than that of testosterone.

These novel 17-tetrahydropyranyl ethers also possess anti-estrogenic and anti-ovulatory activity, lower blood cholesterol levels, and inhibit the secretion of gonadotrophins by the pituitary gland.

The 17-tetrahydropyranyl ethers of the present invention are obtained from the corresponding 17$\beta$-hydroxy steroids by conventional methods of preparing tetrahydropyranyl ethers of steroids having free hydroxyl groups. Thus, the free 17$\beta$-hydroxyl-containing parent compound can be reacted under substantially anhydrous conditions, with an excess of dihydropyran in the presence of a small amount of an acidic catalyst, e.g., hydrochloric acid, p-toluenesulfonic acid, boron trifluoride etherate, and the like, either alone or together with an inert organic solvent such as benzene, diethyl ether, or the like, at a temperature of from about 0° C. to about 50° C., and preferably at room temperature (about 25° C.) for from about 1 hour to about 72 hours.

These novel compounds can be administered in any of a number of conventional pharmaceutical forms, and particularly in ones suited for oral administration, e.g., in solid form, such as in pills, powders, capsules, tablets, or the like, or in liquid form, as syrups, emulsions, suspensions, and the like.

The starting materials 2-methyl-$\Delta^2$-androsten-17$\beta$-ol and 2-methyl-19-nor-$\Delta^2$-androsten-17$\beta$-ol are obtained from 2$\alpha$-methyl-dihydroallotestosterone 17-acetate or 2$\alpha$-methyl-19-nordihydroallotestosterone 17-acetate in the manner described in copending U.S. patent application Serial No. 146,453, filed October 20, 1961. Thus, the 17-acetate is reduced with sodium borohydride to give the corresponding 3-hydroxy intermediate, which is then esterified with tosyl chloride in pyridine to give the corresponding 3-tosylate. Next, the 3-tosylate is refluxed with collidine to eliminate the 3-hydroxyl group and form a double bond between the carbon atoms at the 2- and 3-positions, and this unsaturated intermediate is then saponified to give the corresponding free 17$\beta$-hydroxyl starting material.

The starting materials 2-cyano-$\Delta^2$-androsten-17$\beta$-ol and 2-cyano-19-nor-$\Delta^2$-androsten-17$\beta$-ol have been described in U.S. Patent No. 3,080,401 to Bowers et al.

In order that those skilled in the art can more fully understand the present invention, the following Example is set forth. This example is given solely by way of illustrating the invention, and should not be considered as expressing limitations unless so set forth in the appended claims.

*Example*

To a solution of 1 gram of 2-methyl-$\Delta^2$-androsten-17$\beta$-ol in 25 cc. of benzene there was added 2 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of 2-methyl-$\Delta^2$-androsten-17$\beta$-ol (2-methyl-17$\beta$-tetrahydropyranyloxy-$\Delta^2$-androstene).

By repeating this procedure in every detail but one, namely, replacing 2-methyl-$\Delta^2$-androsten-17$\beta$-ol with 2-methyl-19-nor-$\Delta^2$-androsten-17$\beta$-ol, 2-cyano-$\Delta^2$-androsten-17$\beta$-ol and 2-cyano-19-nor-$\Delta^2$-androsten-17$\beta$-ol, respectively, the corresponding 17-tetrahydropyranyl ethers, i.e., 2-methyl-17$\beta$-tetrahydropyranyloxy-19-nor - $\Delta^2$ - androstene, 2-cyano-17β-tetrahydropyranyloxy-Δ²-androstene and 2-cyano-17β-tetrahydropyranyloxy-19-nor-Δ²-androstene, respectively, were obtained.

I claim:
1. A compound represented by the formula:

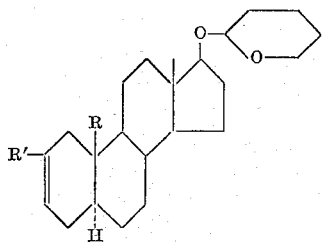

wherein R is selected from the group consisting of hydrogen and methyl and R' is selected from the group consisting of methyl and cyano.

2. The 17-tetrahydropyranyl ether of 2-methyl-Δ²-androsten-17β-ol.
3. The 17-tetrahydropyranyl ether of 2-methyl-19-nor-Δ²-androsten-17β-ol.
4. The 17-tetrahydropyranyl ether of 2-cyano-Δ²-androsten-17β-ol.
5. The 17-tetrahydropyranyl ether of 2-cyano-19-nor-Δ²-androsten-17β-ol.

References Cited by the Examiner

Manson et al.: "J. Med., Chem.," vol. 6, No. 1, Jan. 18, 1963, pages 1–9.

LEWIS GOTTS, *Primary Examiner.*